United States Patent
Marshall (10) Patent No.: US 11,366,328 B1
(45) Date of Patent: Jun. 21, 2022

(54) CONTROLLING A LEVEL OF MAGNIFICATION OF CONTENT ON A DISPLAY DEVICE BASED ON USER MOVEMENT

(71) Applicant: ZEBRA TECHNOLOGIES CORPORATION, Lincolnshire, IL (US)

(72) Inventor: Graham Marshall, Shoreham, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/161,156

(22) Filed: Jan. 28, 2021

(51) Int. Cl.
*G02B 27/01* (2006.01)
*H04N 5/232* (2006.01)
*G02B 27/00* (2006.01)

(52) U.S. Cl.
CPC ..... *G02B 27/0179* (2013.01); *G02B 27/0093* (2013.01); *G02B 27/0172* (2013.01); *H04N 5/23296* (2013.01); *G02B 2027/0138* (2013.01); *G02B 2027/0185* (2013.01)

(58) Field of Classification Search
CPC ............ G02B 27/0179; G02B 27/0093; G02B 27/0172; G02B 2027/0138; G02B 2027/0185; H04N 5/23296
See application file for complete search history.

(56) References Cited

U.S. PATENT DOCUMENTS

| | | | |
|---|---|---|---|
| 9,360,671 B1* | 6/2016 | Zhou | H04N 5/23216 |
| 10,250,948 B1* | 4/2019 | Bortz | H04N 21/4223 |
| 10,268,276 B2* | 4/2019 | Fisher | G06F 3/005 |
| 2006/0187204 A1* | 8/2006 | Yi | G06F 1/1626 345/158 |
| 2009/0196459 A1* | 8/2009 | Watt | H04N 7/185 382/103 |
| 2010/0296802 A1* | 11/2010 | Davies | G03B 17/00 396/77 |
| 2013/0335301 A1* | 12/2013 | Wong | G06F 3/167 345/8 |
| 2014/0240553 A1* | 8/2014 | Pylvanainen | H04N 5/2628 348/240.2 |
| 2015/0070596 A1* | 3/2015 | Gadjali | G02B 27/0172 349/11 |
| 2016/0140766 A1* | 5/2016 | Balachandreswaran | G01S 5/163 345/633 |
| 2016/0299569 A1* | 10/2016 | Fisher | G02B 27/0172 |
| 2017/0249862 A1* | 8/2017 | Border | G06K 9/00671 |
| 2018/0113508 A1* | 4/2018 | Berkner-Cieslicki | G06T 7/292 |
| 2018/0144554 A1* | 5/2018 | Watola | G02B 27/0172 |
| 2019/0139281 A1* | 5/2019 | Chapman | H04N 5/33 |

(Continued)

*Primary Examiner* — Dmitriy Bolotin (57) ABSTRACT

Control of a display of a wearable device is described herein. The wearable device may receive, from the camera, a video stream that depicts a physical environment according to a first level of magnification. The wearable device may present, on the display, the video stream at the first level of magnification. The wearable device may determine that a movement measurement from the movement sensor satisfies a measurement threshold. The wearable device may present, based on determining that the movement measurement satisfies the measurement threshold, the video stream at a second level of magnification.

18 Claims, 7 Drawing Sheets

(56) References Cited

U.S. PATENT DOCUMENTS

2019/0180421 A1* 6/2019 Kim .......................... G06T 5/10
2021/0191236 A1* 6/2021 Schwab ............... H04N 5/2257

* cited by examiner

CONTROLLING A LEVEL OF MAGNIFICATION OF CONTENT ON A DISPLAY DEVICE BASED ON USER MOVEMENT

BACKGROUND

"Augmented reality" (AR) may refer to a live view of a physical (real-world) environment that is modified by a computing device to enhance an individual's current perception of an environment. The computing device may be a wearable AR device, such as smart glasses or other type of headset. During use of a wearable AR device, elements of the physical environment are augmented on a display device by computer-generated or extracted input, such as sound, video, graphics, haptics, informative text, and/or messages, among other examples. Under certain circumstances, there is a need for the AR device to remove any AR images and/or AR views of the physical environment to permit the user to have an authentic view of the physical environment.

SUMMARY

In some implementations, a method of controlling a level of magnification of a display includes capturing, using a camera, a video stream that depicts a physical environment at a first level of magnification; presenting, at the first level of magnification, the video stream on the display of the wearable device; monitoring, based on the first level of magnification, a movement measurement from a movement sensor of the wearable device; determining that the movement measurement satisfies a measurement threshold that is indicative of a particular type of movement of the wearable device; adjusting, based on determining that the movement measurement satisfies the measurement threshold, the first level of magnification to a second level of magnification; and presenting the video stream on the display at the second level of magnification.

In some implementations, a wearable device includes: a camera; a display; a movement sensor; one or more memories; and one or more processors, communicatively coupled to the one or more memories, configured to: receive, from the camera, a video stream that depicts a physical environment according to a first level of magnification; present, on the display, the video stream at the first level of magnification; determine that a movement measurement from the movement sensor satisfies a measurement threshold; and present, based on determining that the movement measurement satisfies the measurement threshold, the video stream at a second level of magnification.

In some implementations, a tangible machine-readable medium storing a set of instructions includes one or more instructions that, when executed by one or more processors of a wearable device, cause the wearable device to: receive, from a camera, a video stream that depicts a physical environment according to a first level of magnification; present, at the first level of magnification, the video stream via a display; detect, using a movement sensor of the wearable device, a particular type of movement of the wearable device based on a movement measurement of the movement sensor; and present, based on detecting the particular type of movement, the video stream according to a second level of magnification.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

In some cases, a user device may be wearable in that the user device may be mounted to a head of a user. For example, an augmented reality (AR) device and/or a virtual reality (VR) device may include a mounting mechanism (e.g., a headband and/or a helmet) that fits over or around a head of the user and covers a field of view of the user. In some instances, such a wearable device may cover a portion of the user's field of view, rather than the entirety of the user's field of view. For example, the wearable device may be mounted in a manner than permits a periphery of the user's field of view to still be viewable by the user when the user is wearing the wearable device (e.g., for safety reasons and/or to permit the user to see a physical environment through the user's peripheral vision). In such cases, a display of the wearable device that is positioned within the field of view may present a digital version of a portion of the field of view of the user. The resolution of the digital version of the field of view of the user may be configured such that a transition from the periphery of the user's field of view (which is not obstructed by the wearable device) to the display of the wearable device appears relatively seamless.

These wearable devices may be used to enhance a user experience and/or may enhance a user's ability to perform tasks and/or operations during certain activities (e.g., activities as a worker of an employer, athletic activities, and/or entertainment-based activities, among other examples).

In this way, the wearable device can be used to cause a physical environment to appear, to the user, to be manipulated by altering settings of the display and/or by augmenting media (e.g., an image, text, a message, and/or video) on the display to cause content of the media to appear to be within the physical environment. Furthermore, the wearable device may include a zoom feature that permits the user to increase or decrease a level of magnification of content presented on the display. Accordingly, using the zoom feature, the user may obtain an enhanced view of a portion of a physical environment of the user (e.g., by increasing a level of magnification of a camera and/or digitally zooming in toward the portion of the physical environment). However, in certain instances, the user may be alerted toward a location of the physical environment that triggers the user to look toward the location. For example, the user may hear a loud noise behind the user that causes the user to turn around, the user may feel an object at the user's feet that causes the user to abruptly look down, and/or the user may detect an approaching object in the user's peripheral vision causing the user to look at the object (e.g., because the user's periphery is not obscured by the wearable device).

In the above scenarios, the user may not think to adjust the zoom feature to a default zoom setting (e.g., due to instinctive impulse to look toward the alert) and/or the user may not have enough time to provide an input that sets the zoom feature to the default zoom setting (e.g., because the moment of the alert may pass and/or be missed by the user). Furthermore, if a zoom feature is enabled, the user may become disoriented and/or unable to detect or identify the source of an alert (e.g., because the level of magnification is not what the user expects when looking toward the alert). Accordingly, there is a need to determine when or how a level of magnification and/or other view settings of a wearable device are to be controlled under certain circumstances.

Some implementations described herein provide a wearable device that controls a level of magnification and/or a view setting associated with content on a display based on movement of a user of the wearable device. For example, the wearable device may utilize a movement sensor to monitor movement of the user based on measurements of movement of the user's head. As described herein, based on the wearable device detecting a particular type of movement (e.g., when a movement measurement satisfies a threshold, such as threshold acceleration, and/or when a movement measurement indicates a particular direction of movement), the wearable device may control the display to present content at a default zoom setting and/or at a standard view setting (e.g., a view setting without any augmented content). In this way, the wearable device, as described herein, may automatically control a level of magnification of content and/or other view settings on a display of the wearable device based on movement of the user, thereby preventing a user from being disoriented and/or permitting the user to automatically have an unobstructed or real-world view of content associated with the physical environment through the display of the wearable device.

Figure 1:
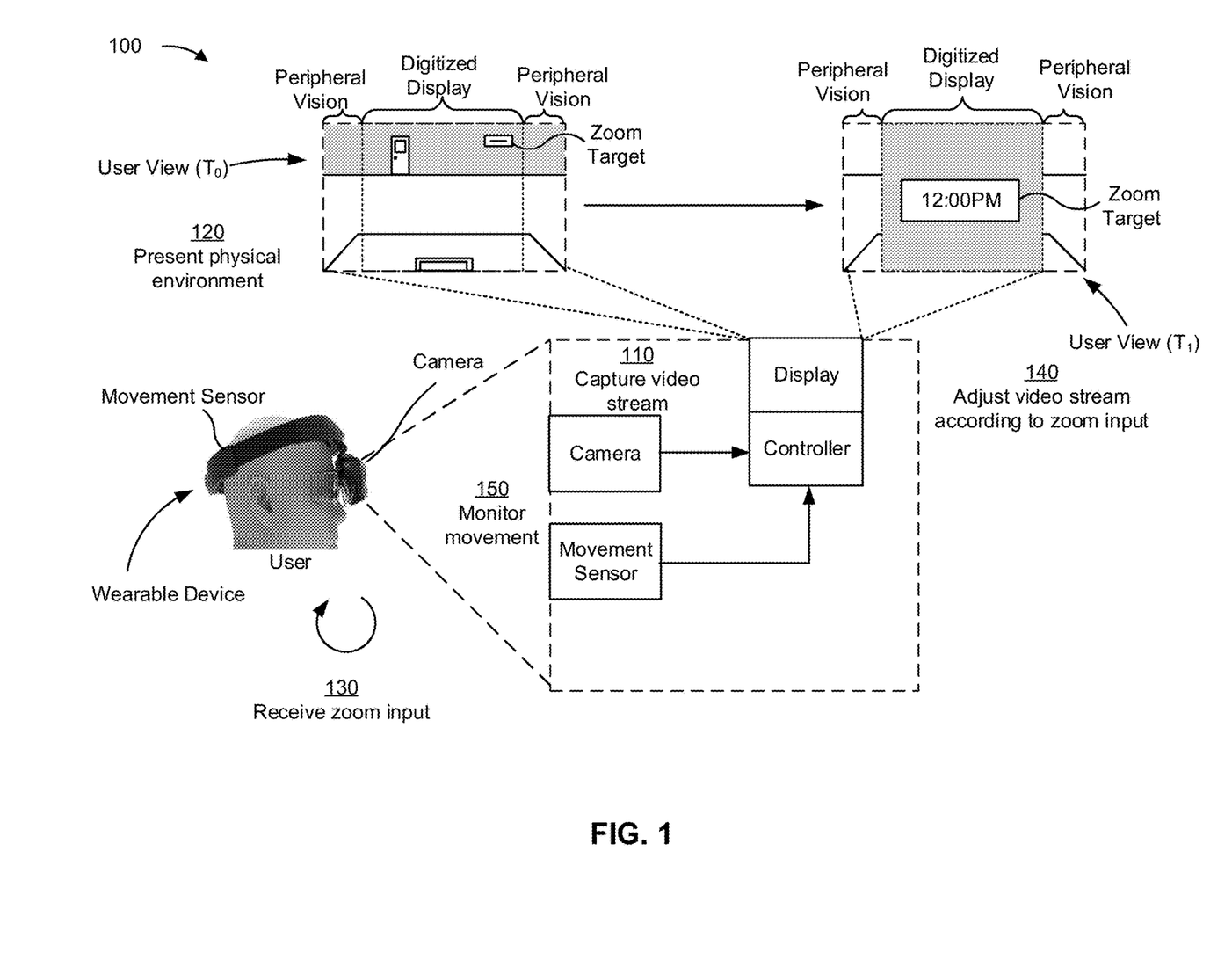
FIG. 1 is a diagram of an example implementation associated with controlling content on a display based on user movement, as described herein.

FIG. 1 is a diagram of an example implementation 100 associated with controlling content on a display based on user movement. As shown in FIG. 1, example implementation 100 includes a wearable device that includes a camera, a movement sensor, a controller, and a display. These devices are described in more detail below in connection with FIG. 4 and FIG. 5. In example implementation 100, the wearable device is configured to present a video stream of a physical environment of a user of the wearable device.

As shown in FIG. 1, and by reference number 110, the wearable device captures a video stream. For example, the controller of the wearable device may cause the camera to capture the video stream based on the wearable device being activated and/or powered on. The camera may provide the video stream to the controller to permit the controller to present the video stream on the display of the wearable device.

As further shown in FIG. 1, and by reference number 120, the wearable device presents the physical environment on the display. As shown, the wearable device may present a digitized view of the physical environment that corresponds to the video stream that is captured by the camera.

In example implementation 100, the wearable device is worn by the user as a head-mounted device. For example, the wearable device may include a heads-up display device, smart glasses, and/or the like. The display may be configured to present video of a physical environment of the user. Accordingly, the video stream may include content that depicts a portion of the physical environment that is within a field of view of the camera. The display may be positioned (e.g., within a housing of the wearable device and/or according to a configuration of a mounting mechanism of the wearable device) between the user's eyes and the camera. The camera may be positioned within the wearable device to have a center of a field of view that aligns with a field of view of the user's eyes. Accordingly, the displayed video stream from the camera provides, to the user, a digitized view of the physical environment. In this way, the wearable device may capture and/or obtain video from a perspective of the user (e.g., such that a displayed field of view is based on a field of view of the user). In the illustrated example, the wearable device does not enclose or cover a field of view of the user.

Accordingly, as shown at time $T_0$ the user may have a real-world view of one or more portions of the physical environment (e.g., one or more portions toward the periphery of the user's field of view and/or one or more portions of the user's field of view that are not blocked by the display) and a digitized view of a portion of the physical environment that is presented on the display according to the video stream. In some implementations, the presented content depicting the physical environment at time $T_0$ may be presented at a default zoom setting of a zoom feature of the wearable device. The default zoom setting may correspond to a zoom setting that provides, to the user, an apparent seamless transition between the physical environment in the periphery of the user's field of view and the presented portion of the physical environment on the display. For example, the default zoom setting may correspond to an initial zoom setting of the zoom feature that is set upon startup or activation of the wearable device. Additionally, or alternatively, the default zoom setting may correspond to a setting that may be designated by the user (e.g., during a calibration of the display).

As further shown in FIG. 1, and by reference number 130, the wearable device receives a zoom input. For example, the zoom input may correspond to an input from the user (e.g., via a user interface) to permit the user to receive an enhanced view of a target of the physical environment that is relatively far from the user and/or a magnified view of small object that is near the user. The zoom input may include and/or identify an adjustment to the zoom setting for content on the display. For example, the zoom input may specify a level of magnification at which content is to be displayed and/or may specify an increase or decrease to a current level of magnification of the zoom setting.

As further shown in FIG. 1, and by reference number 140, the wearable device adjusts the video stream according to the zoom input. For example, the wearable device may adjust the video stream relative to a zoom setting identified in the zoom input. More specifically, the zoom input may indicate that a level of magnification of the video stream (and/or of content displayed in the video stream) is to be increased. Accordingly, as shown in FIG. 1, a zoom target (shown as a digital clock) that may be indistinct in the content of the video stream at time $T_0$ can be magnified as shown in the content of the video stream at time $T_1$. In example implementation 100, the location of the user within the physical environment may be the same at time $T_0$ and time $T_1$. Accordingly, as illustrated in FIG. 1, the level of magnification of the user's peripheral vision (e.g., a 1× zoom) in the user's view at time $T_1$ corresponds to the level of magnification in the user's view at time $T_1$.

The wearable device may adjust the video stream (e.g., from a first video stream associated with the level of magnification at time $T_0$ to a second video stream associated with the level of magnification at time $T_1$) by adjusting an optical zoom setting. For example, the wearable device may cause the camera to adjust an optical zoom component (e.g., a lens or other optical zoom component) of the camera from a first optical zoom setting to a second optical zoom setting that corresponds to the zoom setting identified in the zoom input. Accordingly, the level of magnification of the video stream from the camera may transition from a first level associated with the default zoom setting to a second level associated with the zoom input.

Additionally, or alternatively, the wearable device may adjust the video stream by adjusting a digital zoom setting (e.g., by magnifying a portion of the video stream). For example, the wearable device may determine a digital zoom setting from the zoom input. Additionally, or alternatively, the wearable device may identify a zoom location that is associated with the zoom input. For example, along with the level of magnification, the user may indicate, within a user input associated with the zoom input, a zoom location (e.g., a location of the physical environment and/or a location of frames of the video stream). Accordingly, the wearable device may adjust the video stream to include a subset of image data (e.g., corresponding to portions of frames of the video stream that are associated with the indicated zoom location) of the video stream captured by the camera.

As further shown in FIG. 1, and by reference number 150, the wearable device monitors movement of the user. The movement of the wearable device may correspond to the movement of the user because the user is wearing the wearable device. Accordingly, the wearable device may use the movement sensor to monitor movement of the user's head.

The wearable device may monitor movement of the wearable device based on movement measurements from the movement sensor. For example, the movement sensor may be configured to sense movement of the wearable device and provide measurements associated with the sensed movement periodically, according to a schedule, and/or based on detecting that a movement measurement satisfies a measurement threshold (e.g., a minimum acceleration). The wearable device may monitor the movement based on the zoom setting being adjusted from a default zoom setting of the wearable device. In this way, the wearable device may deactivate the movement sensor when the wearable device is set to present content according to the default zoom setting.

In some implementations, the movement sensor may include an accelerometer. In such a case, the movement measurements may correspond to measurements of acceleration of the user's head. Accordingly, acceleration measurements that indicate relatively slow acceleration of the user's head may correspond to and/or indicate slow or gradual movement of the user's head, and acceleration measurements that indicate relatively fast acceleration of the user's head may correspond to and/or indicate relatively fast or rapid movement of the user's head (e.g., movement that corresponds to a triggered response to an alert, as described above).

In some implementations, the movement sensor may correspond to a module of the camera that is configured to sense movement of the wearable device based on the video stream (e.g., based on an optical flow of the video stream). For example, the movement sensor may correspond to and/or be associated with the camera. In such a case, the camera may monitor movement measurements by monitoring, based on frames of the video stream, an optical flow measurement that is indicative of movement of the camera (which would correspond to movement of the wearable device and/or the user's head).

Figure 2:
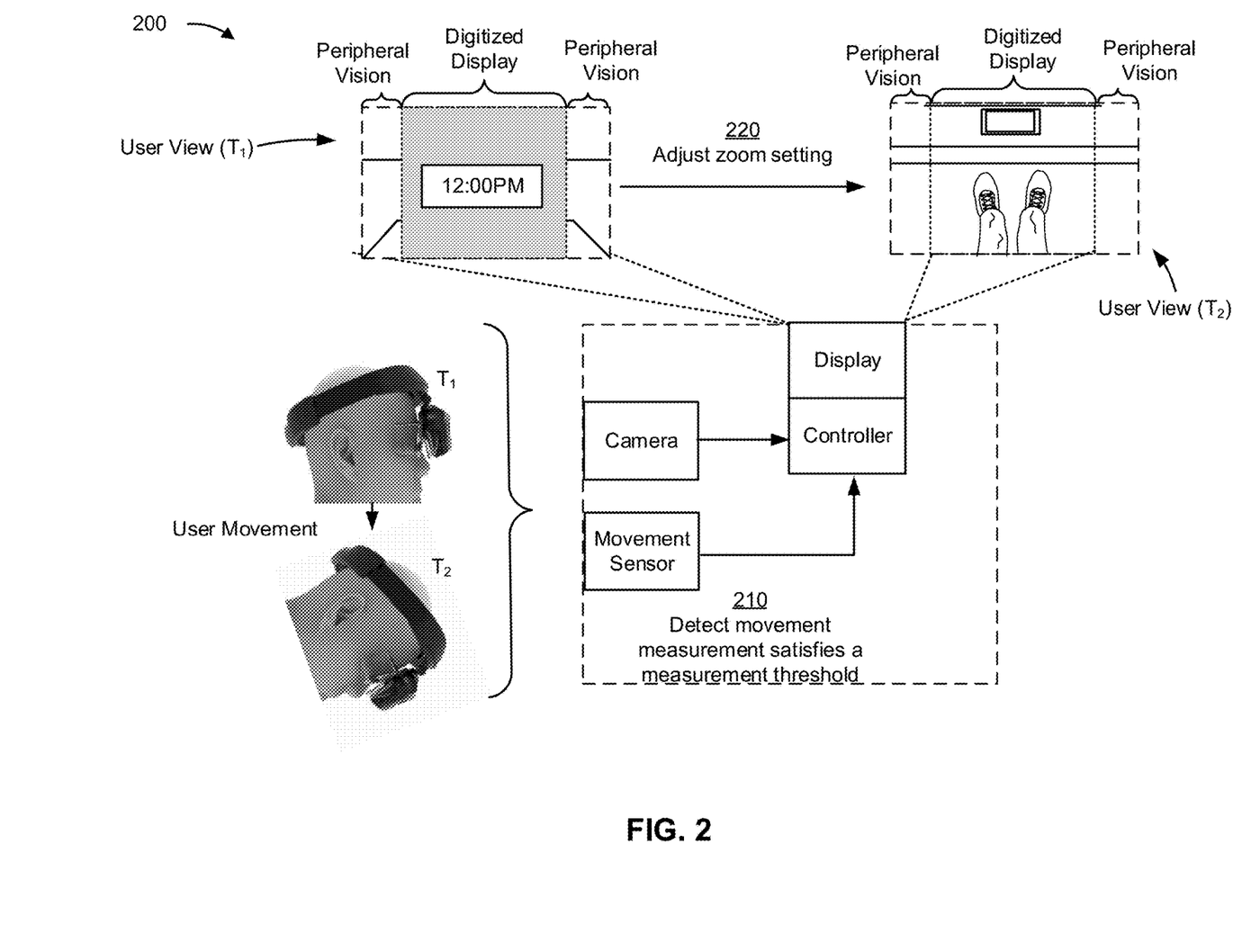
FIG. 2 is a diagram of an example implementation associated with controlling a level of magnification of content on a display based on user movement, as described herein.

FIG. 2 is a diagram of another example implementation 200 associated with controlling a level of magnification of content on a display based on user movement. As shown in FIG. 2, example implementation includes a wearable device. The wearable device of example implementation 200 may correspond to the wearable device described in connection with example implementation 100.

As shown in FIG. 2, and by reference number 210, the wearable device detects that a movement measurement satisfies a measurement threshold. For example, the measurement threshold being satisfied may correspond to a particular type of movement of the wearable device (and/or the user's head). In example implementation 200, between time $T_1$ and a time $T_2$ the user looks downward (e.g., toward the user's shoes or an object near a location of the physical environment that is near the user).

For example, the movement threshold may correspond to a minimum acceleration (and/or a minimum speed), indicating that the user rapidly shifted the user's field of view (e.g., to a location of an alert in the physical environment). Accordingly, the wearable device may determine that the user accelerated the user's head downward at a rate between time $T_1$ and a time $T_2$ that satisfied the minimum acceleration. Additionally, or alternatively, the particular type of movement may correspond to the user shifting the user's field of view in a particular direction. For example, a movement measurement (e.g., a directional measurement and/or optical flow measurement) indicating that the user shifted the user's head to look downward may indicate that the user wants to focus on the physical environment that is physically below the user's head (e.g., to gain balance and/or to avoid an object near the user).

As further shown in FIG. 2, and by reference number 220, the wearable device adjusts the zoom setting. For example, the wearable device, based on detecting that the movement measurement satisfies the measurement threshold, may automatically control the display to present content at a different level of magnification. As shown, and described above, at time $T_1$, the video stream depicts content (the digital clock on a wall) at an increased level of magnification, and at time $T_2$ the wearable device may adjust the video stream to provide content at a level of magnification that is lower than the level of magnification associated with the video stream at time $T_1$ (e.g., a level of magnification that corresponds to a default zoom setting).

Based on detecting that particular type of movement, the wearable device may automatically adjust an optical zoom setting of the camera and/or a digital zoom of the display, as described elsewhere herein. Accordingly, as shown by the user's view at time $T_2$, rather than the user's shoes being magnified (which could disorient the user or prevent the user from identifying the user's shoes), the user may have an apparent real-world view of the physical environment via a video stream that is returned to a default zoom setting (e.g., the level of magnification of the digitized display that depicts the user's shoes matches the level of magnification of the user's peripheral vision).

Figure 3:
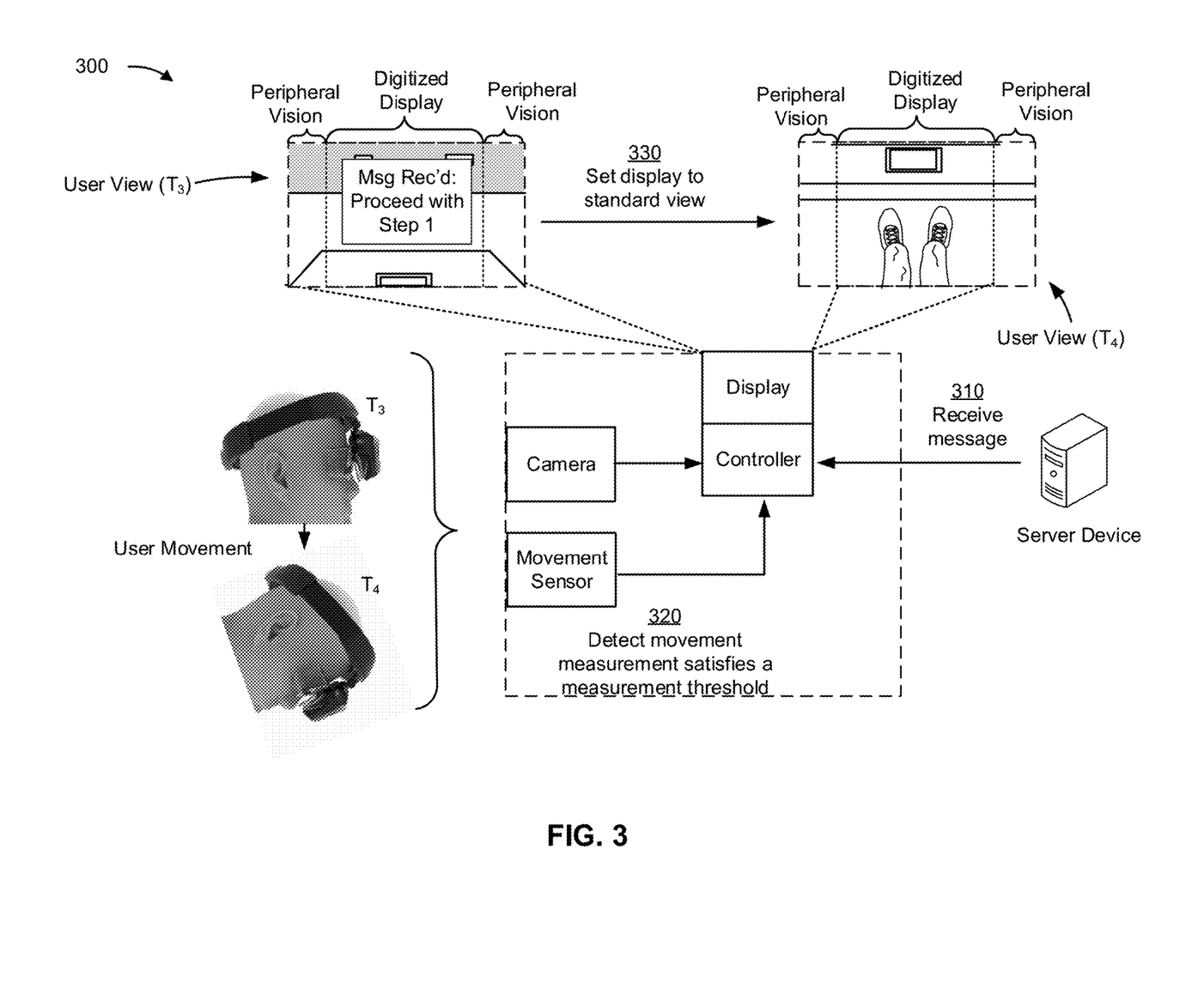
FIG. 3 is a diagram of another example implementation associated with controlling a level of magnification of content on a display based on user movement, as described herein.

FIG. 3 is a diagram of another example implementation 300 associated with controlling a level of magnification of content on a display based on user movement. As shown in FIG. 3, example implementation 300 includes a wearable device and a server device. The wearable device of example implementation 300 may correspond to the wearable device described in connection with example implementation 100 and/or the wearable device described in connection with example implementation 200. The server device may be associated with a platform (e.g., an AR platform) that is associated with an application (e.g., an AR application) of the wearable device.

As shown in FIG. 3, and by reference number 310, the wearable device receives a message. For example, the message may correspond to an AR message that provides instructions to the user. Accordingly, as shown by the user's view at time $T_3$, the controller may cause the display to present the message via the display. For example, the message may be embedded within the video stream and/or overlayed on images of the physical environment, thereby obfuscating a view of the physical environment via the display.

As further shown in FIG. 3, and by reference number 320, the wearable device detects a movement measurement that satisfies a measurement threshold. As shown, in example implementation 300, between time $T_3$ and a time $T_4$ the user looks downward (e.g., toward the user's shoes). Accordingly, the wearable device may determine that a movement measurement from the movement sensor indicates a particular type of movement of the user's head that triggers automated control of the content of the display, as similarly described elsewhere herein.

As further shown in FIG. 3, and by reference number 330, the wearable deice sets the display to a standard view. The standard view may correspond to a view of the video stream from the camera that does not depict any media (e.g., AR media associated with an AR application of the wearable device) or messages (e.g., messages from the server device). Accordingly, as shown, and similar to adjusting the zoom setting above, at time $T_3$, the video stream depicts content that includes the received message, and at time $T_4$ the wearable device may automatically (e.g., without user instruction after receiving the message) adjust the video stream to remove the message from the video stream. In this way, the wearable device may provide and/or control the wearable device to present an unobstructed view of the physical environment based on detecting a particular type of user movement (and/or detecting that a movement measurement satisfies a measurement threshold).

As indicated above, FIGS. 1-3 are provided as one or more examples. Other examples may differ from what is described with regard to FIGS. 1-3. The number and arrangement of devices shown in FIGS. 1-3 are provided as an example. In practice, there may be additional devices, fewer devices, different devices, or differently arranged devices than those shown in FIGS. 1-3. Furthermore, two or more devices shown in FIGS. 1-3 may be implemented within a single device, or a single device shown in FIGS. 1-3 may be implemented as multiple, distributed devices. Additionally, or alternatively, a set of devices (e.g., one or more devices) shown in FIGS. 1-3 may perform one or more functions described as being performed by another set of devices shown in FIGS. 1-3.

Figure 4:
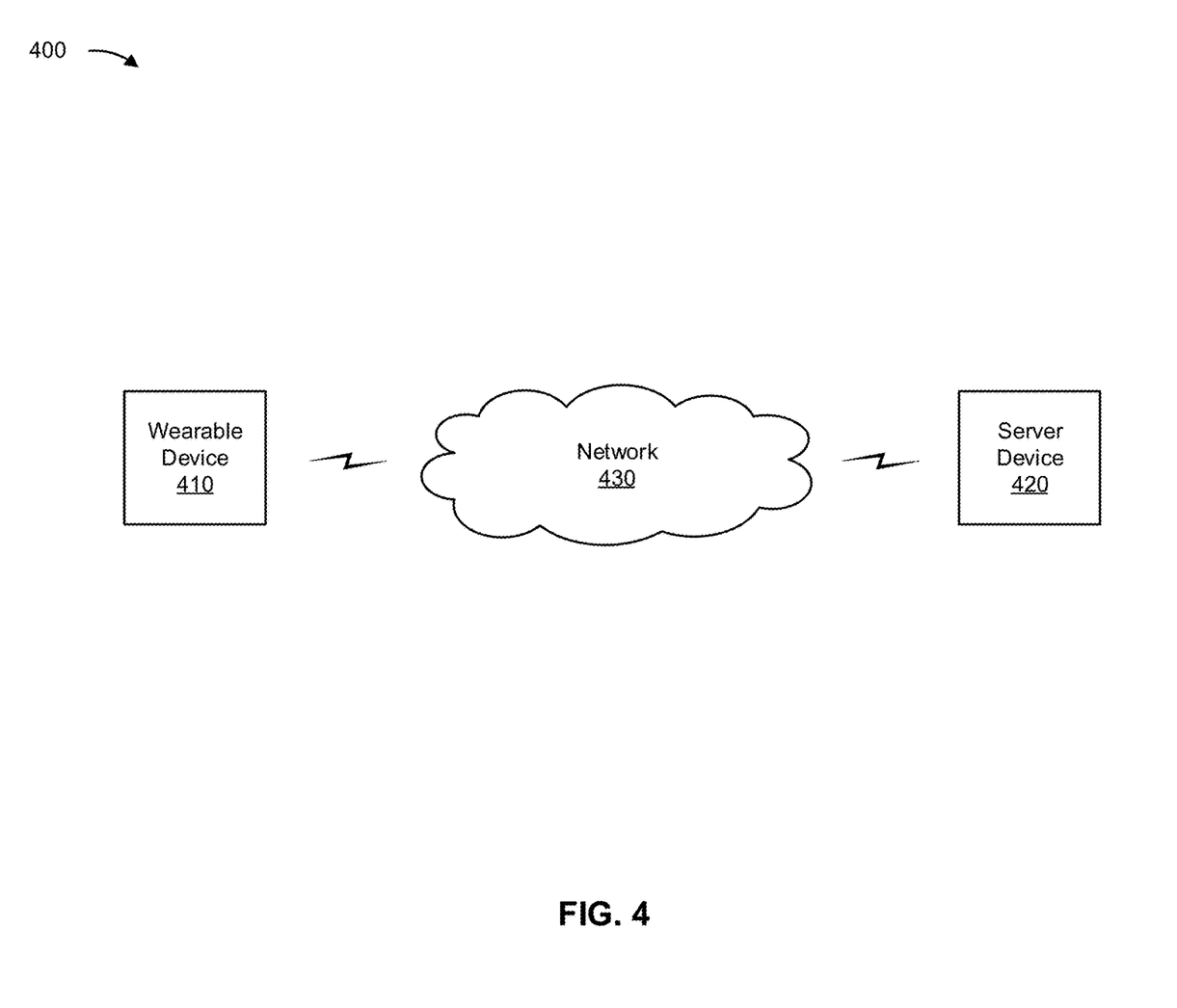
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a wearable device 410, a server device 420, and a network 430. Devices of environment 400 may interconnect via wired connections, wireless connections, or a combination of wired and wireless connections.

The wearable device 410 includes one or more devices capable of receiving, generating, storing, processing, and/or providing information associated with controlling a level of magnification of a display device based on user movement, as described elsewhere herein. The wearable device 410 may include a communication device and/or a computing device that is capable of being worn by a user (e.g., via a mounting mechanism, such as a headband and/or a helmet). For example, the wearable device 410 may include a wireless communication device, a mobile phone, a user equipment, a tablet computer, a gaming console, a wearable communication device (e.g., a pair of smart eyeglasses, a head mounted display, an AR headset, or a VR headset), or a similar type of device.

The server device 420 includes one or more devices capable of receiving, generating, storing, processing, providing, and/or routing information associated with content that is to be displayed on a display of wearable device 410, as described elsewhere herein. The server device 420 may include a communication device and/or a computing device. For example, the server device 420 may include a server, such as an application server, a client server, a web server, a database server, a host server, a proxy server, a virtual server (e.g., executing on computing hardware), or a server in a cloud computing system. In some implementations, the server device 420 includes computing hardware used in a cloud computing environment.

The network 430 includes one or more wired and/or wireless networks. For example, the network 430 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 430 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
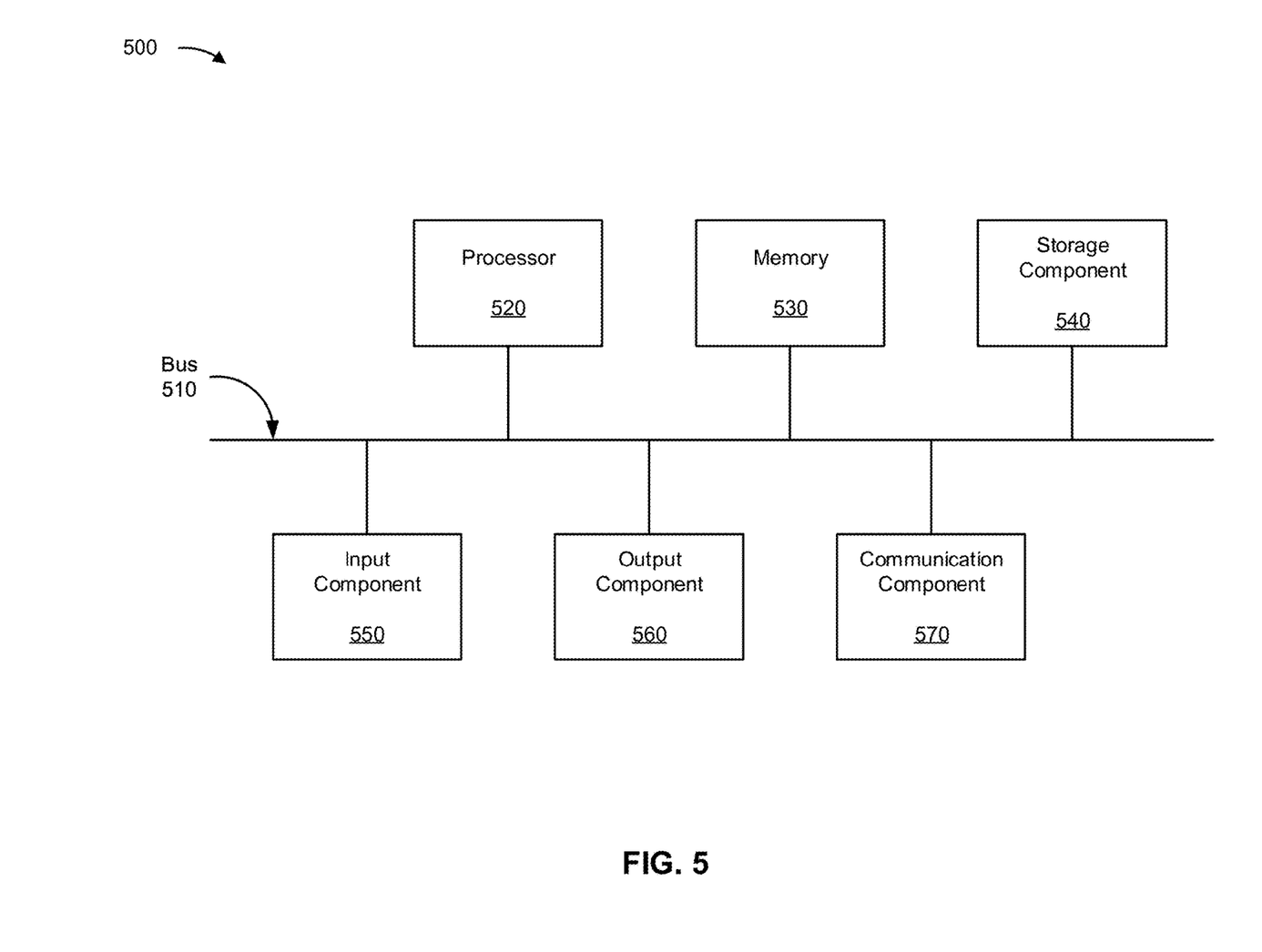
FIG. 5 is a diagram of example components of one or more devices of FIG. 4.

FIG. 5 is a diagram of example components of a device 500, which may correspond to the wearable device 410 and/or the server device 420. In some implementations, the wearable device 410 and/or the server device 420 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
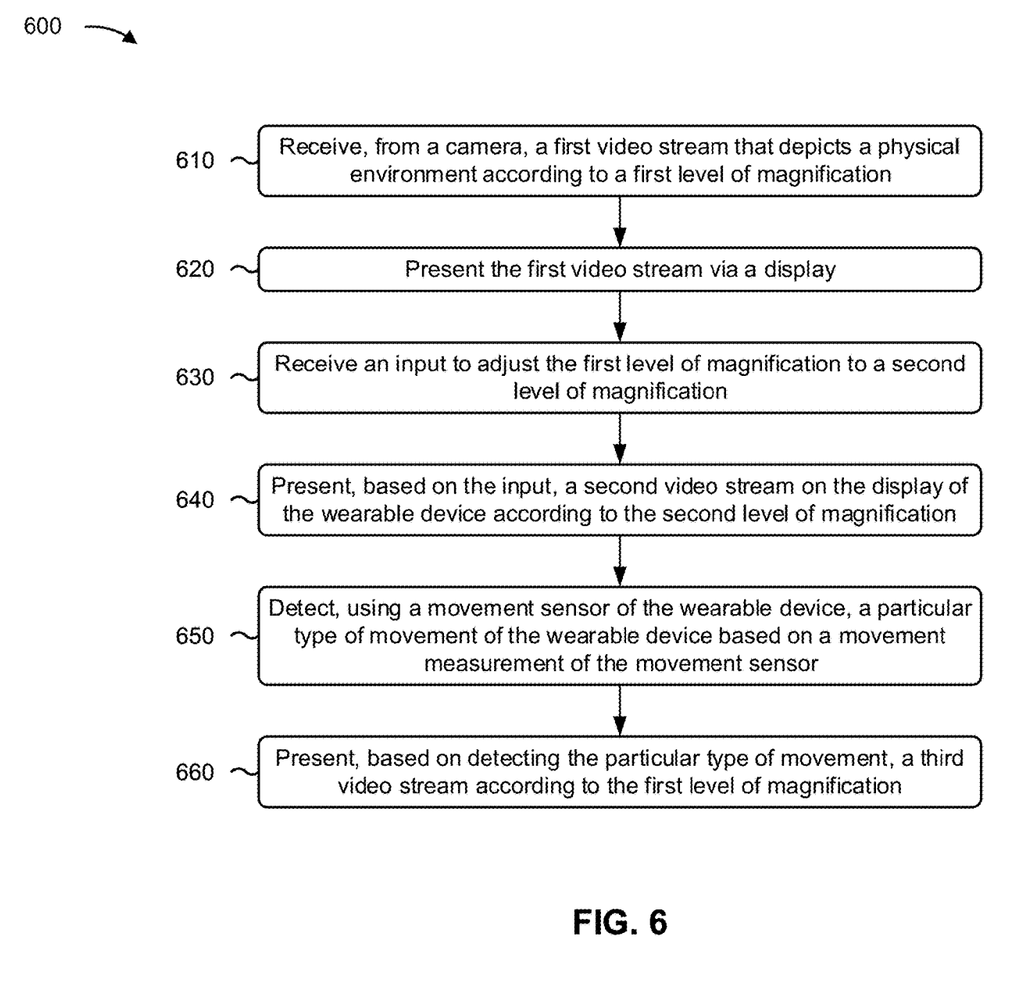
FIG. 6 is a flowchart of an example process associated with controlling a level of magnification of a display based on user movement.

FIG. 6 is a flowchart of an example process 600 associated with controlling a level of magnification of a display device based on user movement. In some implementations, one or more process blocks of FIG. 6 may be performed by a wearable device (e.g., wearable device 410). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving, from a camera, a first video stream that depicts a physical environment according to a first level of magnification (block 610). For example, the wearable device may receive, from a camera, a first video stream that depicts a physical environment according to a first level of magnification, as described above. In some implementations, the wearable device may capture the first video stream using the camera (e.g., cause the camera to capture the first video stream).

As further shown in FIG. 6, process 600 may include presenting the first video stream via a display (block 620). For example, the wearable device may present the first video stream via a display, as described above. In some implementations, the display is configured to be positioned between a lens of the camera and an eye of a user when the wearable device is worn on a head of the user.

As further shown in FIG. 6, process 600 may include receiving an input to adjust the first level of magnification to a second level of magnification (block 630). For example, the wearable device may receive an input to adjust the first level of magnification to a second level of magnification, as described above. In some implementations, the input indicates at least one of a digital zoom setting for the second video stream, and an optical zoom setting for an optical component of the camera. Additionally, or alternatively, the second level of magnification may be greater than the first level of magnification.

As further shown in FIG. 6, process 600 may include presenting, based on the input, a second video stream on the display of the wearable device according to the second level of magnification (block 640). For example, the wearable device may present, based on the input, a second video stream on the display of the wearable device according to the second level of magnification, as described above.

In some implementations, prior to presenting the second video stream, the wearable device may obtain and/or generate the second video stream. For example, the wearable device may determine, based on the input, a digital zoom setting for the second video stream and generate the second video stream from a subset of image data of the first video stream based on the digital zoom setting. Additionally, or alternatively, the wearable device may cause, based on the input, the camera to adjust an optical component of the camera from a first optical setting associated with the first level of magnification to a second optical setting associated with the second level of magnification; and receive the second video stream from the camera in association with the optical component being set to the second optical setting.

As further shown in FIG. 6, process 600 may include detecting, using a movement sensor of the wearable device, a particular type of movement of the wearable device based on a movement measurement of the movement sensor (block 650). For example, the wearable device may determine that the movement measurement from the movement sensor satisfies a measurement threshold, as described above. The movement sensor may include an accelerometer, gyroscope, and/or another type of movement detection system, and/or the measurement threshold may correspond to a minimum acceleration measurement.

As further shown in FIG. 6, process 600 may include presenting, based on detecting the particular type of movement, a third video stream according to the first level of magnification (block 660). For example, the wearable device may present, based on detecting the particular type of movement, a third video stream according to the first level of magnification, as described above. The first level of magnification may be associated with a default zoom setting of the camera and/or the wearable device.

In some implementations, the wearable device may determine an initial digital zoom setting for the first video stream and generate the third video stream from the first video stream according to the initial digital zoom setting. The initial digital zoom setting may correspond to a default zoom setting of the camera and/or wearable device. The particular type of movement corresponds to a movement of the wearable device with at least a minimum acceleration or a movement of the wearable device toward a particular direction.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
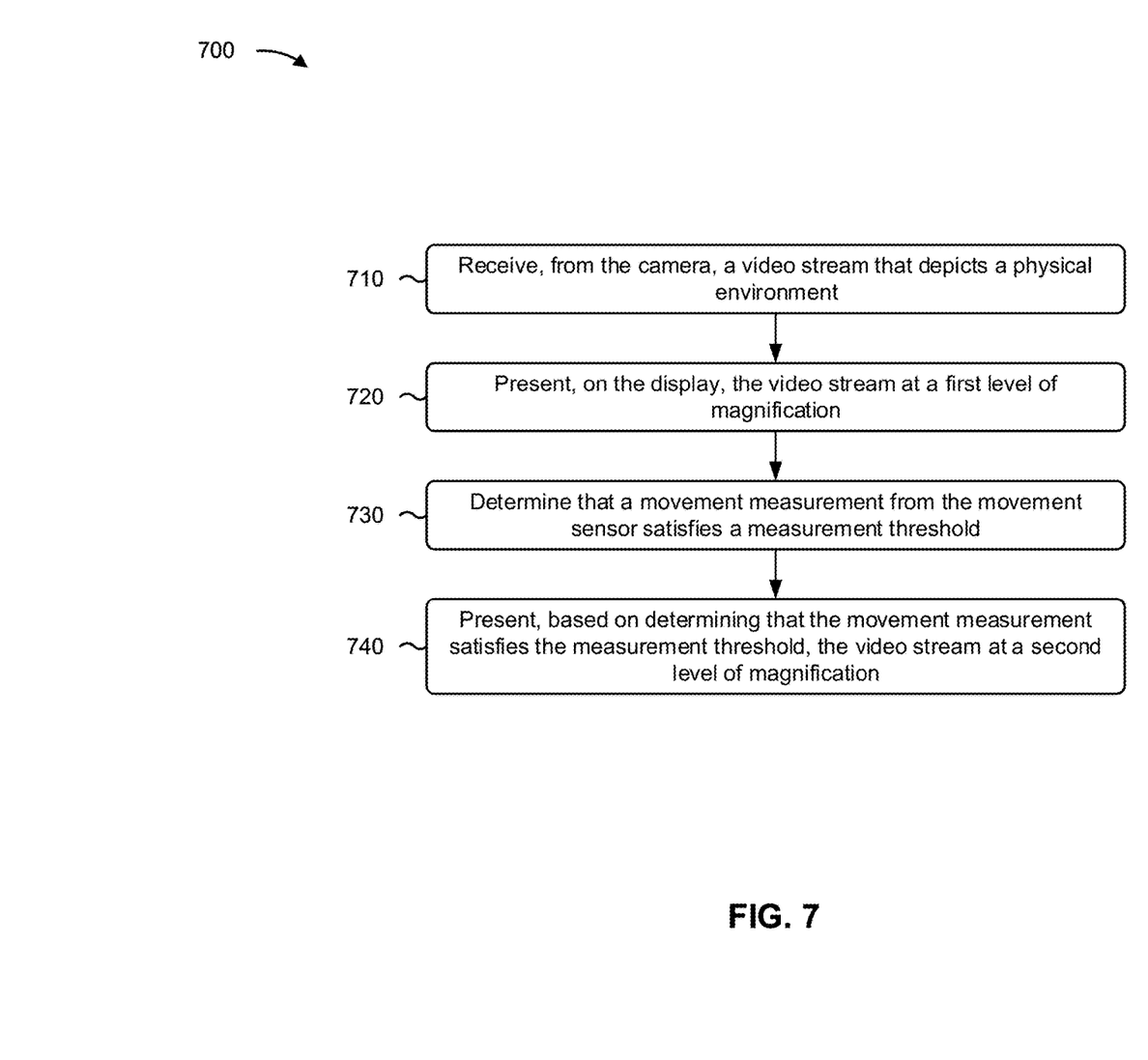
FIG. 7 is a flowchart of an example process associated with controlling a level of magnification of content on a display device.

FIG. 7 is a flowchart of an example process 700 associated with controlling a level of magnification of content on a display device. In some implementations, one or more process blocks of FIG. 7 may be performed by a wearable device (e.g., wearable device 410). Additionally, or alternatively, one or more process blocks of FIG. 7 may be performed by one or more components of device 500, such as processor 520, memory 530, storage component 540, input component 550, output component 560, and/or communication interface 570.

As shown in FIG. 7, process 700 may include receiving, from a camera, a video stream that depicts a physical environment (block 710). For example, the wearable device may receive, from the camera, a video stream that depicts a physical environment, as described above.

As further shown in FIG. 7, process 700 may include presenting, on the display, the video stream at a first level of magnification (block 720). For example, the wearable device may present, on the display, the video stream at the first level of magnification, as described above. The video stream may be presented at the first level of magnification based on receiving an input that identifies the first level of magnification (e.g., an input indicating a zoom setting of the video stream). The input may indicate a digital zoom setting for the video stream and/or an optical zoom setting for an optical component of the camera.

As further shown in FIG. 7, process 700 may include determining that a movement measurement from the movement sensor satisfies a measurement threshold (block 730). For example, the wearable device may determine that a movement measurement from the movement sensor satisfies a measurement threshold, as described above. In some implementations, process 700 includes the movement sensor comprises an accelerometer, the movement measurement corresponds to an acceleration measurement, and the measurement threshold corresponds to a threshold acceleration. For example, the measurement threshold may correspond to a minimum acceleration measurement.

As further shown in FIG. 7, process 700 may include presenting, based on determining that the movement measurement satisfies the measurement threshold, the video stream at a second level of magnification (block 740). For example, the wearable device may present, based on determining that the movement measurement satisfies the measurement threshold, the video stream at a second level of magnification, as described above.

The measurement threshold may be associated with and/or indicative of a particular type of movement of the wearable device (and/or the user's head). For example, the particular type of movement may correspond to a movement of the wearable device with at least a minimum acceleration; and a movement of the wearable device toward a particular direction.

The second level of magnification may be associated with a default zoom setting. In some implementations, the first level of magnification is greater than the second level of magnification (e.g., after the user increases a zoom setting and movement is to trigger a reduction in the level of magnification). Alternatively, the first level of magnification may be lower than the second level of magnification. For example, the movement may indicate that the wearable device returned to a previous position of the wearable device (e.g., because the user returned attention from briefly looking toward an alert back to looking at the previous location of the physical environment that was magnified in the video stream).

In some implementations, prior to presenting the video stream at the second level of magnification, the wearable device may determine a zoom setting that is associated with the movement measurement satisfying the measurement threshold, wherein the second level of magnification is associated with the zoom setting.

The wearable device may adjust the first level of magnification to the second level of magnification by adjusting a digital zoom setting of the video stream from the first level of magnification to the second level of magnification. For example, the wearable device may alter the video stream from including a portion of the video stream that is associated with the first level of magnification to include a portion of the video stream associated with the second level of magnification. In some implementations, the wearable device may adjust the first level of magnification to the second level of magnification by adjusting an optical zoom setting of the camera. For example, the wearable device may cause the camera to adjust an optical zoom component of the camera from a first optical zoom setting associated with the first level of magnification to a second optical zoom setting associated with the second level of magnification.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method of controlling a level of magnification of a display, comprising:
  capturing, by a wearable device and using a camera, a video stream that depicts a physical environment;

presenting, by the wearable device and at a first level of magnification, the video stream on the display of the wearable device;

monitoring, by the wearable device and based on the first level of magnification, a movement measurement from a movement sensor of the wearable device;

determining, by the wearable device, that the movement measurement satisfies (i) a first measurement threshold that is indicative of movement of the wearable device in a predefined direction, and (ii) a second measurement threshold that is indicative of movement of the wearable device with at least a minimum acceleration;

adjusting, by the wearable device and based on determining that the movement measurement satisfies the first measurement threshold and the second measurement threshold, the first level of magnification to a second level of magnification, wherein the second level of magnification is lower than the first level of magnification; and presenting, by the wearable device, the video stream on the display at the second level of magnification.

2. The method of claim 1, wherein adjusting the first level of magnification to the second level of magnification comprises:

adjusting a digital zoom setting of the video stream from the first level of magnification to the second level of magnification.

3. The method of claim 2, wherein adjusting the digital zoom setting comprises:

altering the video stream from including a portion of the video stream that is associated with the first level of magnification to include a portion of the video stream associated with the second level of magnification.

4. The method of claim 1, wherein adjusting the first level of magnification to the second level of magnification comprises:

adjusting an optical zoom setting of the camera.

5. The method of claim 4, wherein adjusting the optical zoom setting comprises:

causing the camera to adjust an optical zoom component of the camera from a first optical zoom setting associated with the first level of magnification to a second optical zoom setting associated with the second level of magnification.

6. The method of claim 1, further comprising:

prior to presenting the video stream at the first level of magnification, receiving an input to set the video stream to the first level of magnification, wherein the first level of magnification is greater than the second level of magnification.

7. The method of claim 6, wherein the input indicates at least one of:

a digital zoom setting for the video stream; and an optical zoom setting for an optical component of the camera.

8. The method of claim 1, wherein the video stream is presented at the first level of magnification based on receiving a user input that identifies a zoom setting associated with the first level of magnification.

9. A wearable device, comprising:

a camera;

a movement sensor;

one or more memories; and one or more processors, communicatively coupled to the one or more memories, configured to:

receive, from the camera, a video stream that depicts a physical environment;

present, on the display, the video stream at a first level of magnification;

determine that a movement measurement from the movement sensor satisfies (i) a first measurement threshold that is indicative of movement of the wearable device in a predefined direction, and (ii) a second measurement threshold that is indicative of movement of the wearable device with at least a minimum acceleration; and present, based on determining that the movement measurement satisfies the first measurement threshold and the second measurement threshold, the video stream at a second level of magnification.

10. The wearable device of claim 9, wherein the second level of magnification is associated with a default zoom setting.

11. The wearable device of claim 9, wherein the one or more processors are further configured to, prior to presenting the video stream at the second level of magnification:

determine a zoom setting that is associated with the movement measurement satisfying the measurement threshold, wherein the second level of magnification is associated with the zoom setting.

12. The wearable device of claim 9, wherein the movement sensor comprises an accelerometer, the movement measurement includes an acceleration measurement, and the second measurement threshold corresponds to a threshold acceleration.

13. The wearable device of claim 9, wherein the first level of magnification is greater than the second level of magnification.

14. A non-transitory tangible machine-readable medium storing a set of instructions, the set of instructions comprising:

one or more instructions that, when executed by one or more processors of a wearable device, cause the wearable device to:

receive, from a camera, a video stream that depicts a physical environment according to a first level of magnification;

present, at the first level of magnification, the video stream via a display;

detect, using a movement sensor of the wearable device, a particular type of movement of the wearable device based on a movement measurement of the movement sensor that satisfies (i) a first measurement threshold indicative of movement of the wearable device in a predefined direction, and (ii) a second measurement threshold indicative of movement of the wearable device with at least a minimum acceleration; and present, based on detecting the particular type of movement, the video stream according to a second level of magnification.

15. The non-transitory tangible machine-readable medium of claim 14, wherein the one or more instructions, when causing the wearable device to present the video stream according to the second level of magnification, cause the wearable device to:

adjust a digital zoom setting to a default zoom setting that is associated with the second level of magnification; and output the video stream according to the default zoom setting.

16. The non-transitory tangible machine-readable medium of claim 14, wherein the one or more instructions, when causing the wearable device to present the video stream according to the second level of magnification, cause the wearable device to:
- adjust an optical zoom component of the camera to a default zoom setting that is associated with the second level of magnification; and
- output the video stream according to the default zoom setting.

17. The non-transitory tangible machine-readable medium of claim 14, wherein the movement sensor comprises an accelerometer.

18. The non-transitory tangible machine-readable medium of claim 14, wherein the second level of magnification is less than the first level of magnification.

* * * * *